United States Patent
Schroeder

(10) Patent No.: US 11,816,601 B2
(45) Date of Patent: Nov. 14, 2023

(54) VEHICLE RENTAL SYSTEM AND METHOD

(71) Applicant: Bayerische Motoren Werke Aktiengesellschaft, Munich (DE)

(72) Inventor: Astrid Schroeder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1747 days.

(21) Appl. No.: 14/172,182

(22) Filed: Feb. 4, 2014

(65) Prior Publication Data

US 2014/0149156 A1   May 29, 2014

Related U.S. Application Data

(63) Continuation of application No. PCT/EP2012/065046, filed on Aug. 1, 2012.

(30) Foreign Application Priority Data

Aug. 5, 2011   (DE) .................... 10 2011 080 557 .5

(51) Int. Cl.
*G06Q 10/02* (2012.01)
*G08G 1/123* (2006.01)
(Continued)

(52) U.S. Cl.
CPC .............. *G06Q 10/02* (2013.01); *E04H 6/426* (2013.01); *G06Q 50/30* (2013.01); *G07B 15/02* (2013.01); *G08G 1/123* (2013.01)

(58) Field of Classification Search
CPC ........ G06Q 10/02; G06Q 50/30; G07B 15/00; E04H 6/426; G08G 1/123
See application file for complete search history.

(56) References Cited

U.S. PATENT DOCUMENTS 5,289,369 A   2/1994   Hirshberg
5,717,387 A   2/1998   Suman et al.
(Continued)

FOREIGN PATENT DOCUMENTS

CN   101009049 A   8/2007
CN   101320495 A   12/2008
(Continued)

OTHER PUBLICATIONS

Returning your car avis made easy. Nov. 10, 2008 https://www.avios.com/pdf/avis.pdf (Year: 2008).*
(Continued)

*Primary Examiner* — Shannon S Campbell
*Assistant Examiner* — Manal A. Alsamiri
(74) *Attorney, Agent, or Firm* — Crowell & Moring LLP

(57) ABSTRACT

A computerized operation of a vehicle rental system is provided, wherein a number of vehicles is made available to a defined user group for a temporary use period. The vehicles are placed at one or more locations accessible only to the user group, with one or multiple parking spaces reserved for the vehicles in each case. Based on a user input which includes at least one item of data regarding a rental period start and a rental period end of a vehicle, as well as a user ID, a reservation of the vehicle is carried out in a computerized reservation system. A sensor device, which monitors the parking spaces, verifies the presence of the vehicle. The reservation system shows a vehicle, the same being detected by the sensor device as parked in one of the reserved parking spaces prior to the expiration of the rental period end and saved in the reservation system, as available for rental in the reservation system.

12 Claims, 1 Drawing Sheet

(51) Int. Cl.
*G07B 15/02* (2011.01)
*G06Q 50/30* (2012.01)
*E04H 6/42* (2006.01)

(56) References Cited

U.S. PATENT DOCUMENTS

| | | | | |
|---|---|---|---|---|
| 5,726,885 A * | 3/1998 | Klein | ................ | G06Q 10/02 |
| | | | | 235/384 |
| 6,336,295 B1 | 1/2002 | Takei et al. | | |
| 6,696,981 B1 | 2/2004 | Hashimoto | | |
| 6,947,881 B1 | 9/2005 | Murakami et al. | | |
| 2003/0004772 A1 | 1/2003 | Dutta et al. | | |
| 2004/0054600 A1 | 3/2004 | Shike et al. | | |
| 2005/0080752 A1 | 4/2005 | Uehara et al. | | |
| 2006/0095286 A1* | 5/2006 | Kimura | ............. | G06Q 10/02 |
| | | | | 707/E17.108 |
| 2006/0114531 A1* | 6/2006 | Webb | ................ | G01N 21/8851 |
| | | | | 359/15 |
| 2007/0138347 A1* | 6/2007 | Ehlers | ............ | G01C 21/34 |
| | | | | 246/1 R |
| 2007/0150336 A1* | 6/2007 | Boily | ............... | G07B 15/00 |
| | | | | 705/13 |
| 2010/0280700 A1* | 11/2010 | Morgal | ............. | G06Q 10/02 |
| | | | | 705/5 |
| 2011/0112969 A1* | 5/2011 | Zaid | ............... | G06F 21/35 |
| | | | | 701/2 |
| 2012/0095812 A1* | 4/2012 | Stefik | ............... | G06Q 10/02 |
| | | | | 705/13 |
| 2012/0259646 A1* | 10/2012 | Itaya | ................ | G06Q 30/0639 |
| | | | | 705/1.1 |
| 2013/0085898 A1* | 4/2013 | Qian | ................ | G06Q 30/02 |
| | | | | 705/27.2 |

FOREIGN PATENT DOCUMENTS

| | | | | |
|---|---|---|---|---|
| CN | 101833729 A | | 9/2010 | |
| DE | 44 29 852 A1 | | 2/1996 | |
| DE | 199 17 885 C1 | | 8/2000 | |
| DE | 100 16 901 A1 | | 11/2000 | |
| EP | 0 698 864 A2 | | 2/1996 | |
| EP | 1 067 481 A2 | | 1/2001 | |
| EP | 1 318 469 A1 | | 6/2003 | |
| GB | 2 349 257 A | | 10/2000 | |
| JP | 2002288784 A | * | 10/2002 | ......... G06Q 30/0645 |
| JP | 2002288784 A | * | 10/2002 | ............ G08G 1/202 |
| JP | 2004-178385 A | | 6/2004 | |
| JP | 2011-95880 A | | 5/2011 | |
| JP | 2011138560 A | * | 7/2011 | |
| JP | 2011258069 A | * | 12/2011 | |

OTHER PUBLICATIONS

International Preliminary Report on Patentability (PCT/IB/326) and (PCT/IB/373) dated Feb. 20, 2014, including Written Opinion (PCT/ISA/237) (ten (10) pages).
German Search Report dated Mar. 2, 2012 with partial English translation (ten (10) pages).
International Search Report dated Oct. 9, 2012 with English translation (seven (7) pages).
Chinese Office Action issued in counterpart Chinese Application No. 201280038012.2 dated Mar. 27, 2015 with English-language translation (nineteen (19) pages).
Chinese Office Action issued in counterpart Chinese Application No. 201280038012.2 dated Nov. 19, 2015 (nine (9) pages).
Chinese Office Action issued in counterpart Chinese Application No. 201280038012.2 dated Jun. 13, 2016 with English-language translation (seventeen (17) pages).

* cited by examiner

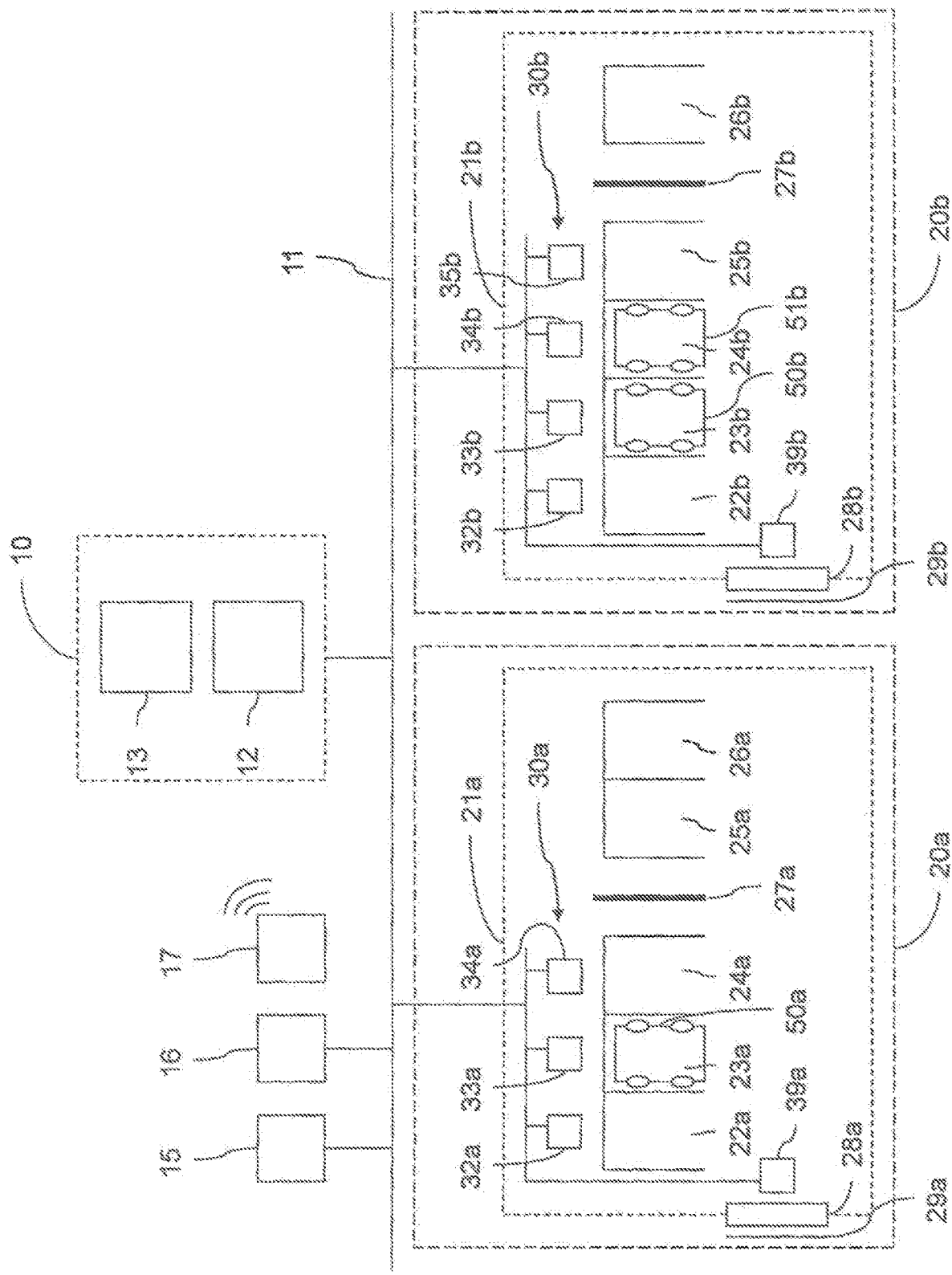

VEHICLE RENTAL SYSTEM AND METHOD

CROSS REFERENCE TO RELATED APPLICATIONS

This application is a continuation of PCT International Application No. PCT/EP2012/065046, filed Aug. 1, 2012, which claims priority under 35 U.S.C. § 119 from German Patent Application No. 10 2011 080 557.5, filed Aug. 5, 2011, the entire disclosures of which are herein expressly incorporated by reference.

BACKGROUND AND SUMMARY OF THE INVENTION

The invention relates to a method for the computerized operation of a vehicle rental system, and to a vehicle rental system.

A vehicle rental system (a so-called car sharing system) is the organized communal use of one or multiple vehicles. The vehicles of a car sharing organization are mostly distributed across a city or a larger town at permanently reserved parking spaces. The locations are frequently at nodes of public transport (such as train stations, bus line terminuses, etc.), where they can be easily reached by the members of the car-sharing organization. The vehicles reserved in advance are mostly used to reach even quite distant destinations starting from these node points. In contrast to a classical car rental, the vehicle can also be used for short periods of time, for example by the hour. In urban residential quarters most of all, where there is not one parking space for each vehicle, car-sharing can relieve a parking space shortage.

Car-sharing in the manner named above is therefore based on a well-established public transit system, and constitutes a means of "combined mobility." In classical car-sharing schemes, it is disadvantageous that a user must first travel to one of the locations of the car-sharing organization before he can use the vehicle. A direct use from the apartment or place of work is generally not possible. Moreover, the duration of use of the vehicle must be fixed in advance. A vehicle in use must be brought back on time in order to ensure that subsequent users can take the car in a timely manner. Moreover, it is not possible to personalize the vehicles.

Various different systems are used for the reservation of the vehicle in a car-sharing organization. Solutions are known which range from having simple key boxes and manual reservation to highly complex computer-based solutions. In larger organizations, the automatic reservation is possible via Internet or telephone computer around the clock. Likewise, the vehicles are frequently equipped with on-board computers which automatically synchronize with the central computer. The on-board computers provide access to the vehicle for the authorized party only during the reserved period of time. In this way, the reservation is made more efficient. Moreover, misuse is thereby prevented.

In addition to the classical car-sharing system, so-called roadside car-sharing has become established in large cities recently. In this system, the vehicles are not stationed at fixed locations, but rather are parked everywhere within a fixed area of a city. As such, a user can also make one-way trips. One assumes that the vehicles are essentially evenly distributed in the city area. The goal is that each participant can reach a vehicle when necessary within, for example 15 minutes on foot. Available vehicles can be located and spontaneously rented via the Internet, smart phone application, or telephone, and can be reserved for a specific period of time in advance. The billing is based on use time, wherein the price includes a per-minute price, distance travelled, insurance, and parking in the indicated areas. Such roadside car-sharing systems are offered, by way of example, as Car2go from the Daimler AG company, and Drive Now from the BMW AG company.

This mobility service has gained acceptance particularly as a result of the roadside car-sharing system. It would be desirable to further optimize car sharing in such a manner that the greatest possible exploitation of the vehicles of the organization results.

The problem addressed by the invention is that of providing a method which enables an improved utilization of the vehicles operated in a vehicle rental system. This problem is addressed by a method according to the invention, and by a vehicle rental system according to the invention. Advantageous embodiments are described and claimed herein.

The invention creates a method for the computerized operation of a vehicle rental system. In this system, a number of vehicles are provided to a defined user group (circle of users) for a temporary duration of use. The term "vehicles" not only means motor vehicles (cars) of the conventional type, but also electric cars, bicycles, e-bikes (pedelecs), and other means of conveyance suitable for individual transport.

The vehicles are provided at one or multiple locations which are accessible only to the circle of users, said locations having one or multiple parking spaces reserved for the vehicles. In the method according to the invention, the spontaneous rental of a vehicle parked on the side of the street is therefore not part of the method. The locations which are exclusively accessible to the circle of users are preferably parking garages which are otherwise inaccessible to the public. As an alternative to parking garages, these can be parking spaces which are located above-ground and are inaccessible to the public.

On the basis of a user input which includes at least one item of data on a rental period start and optionally a rental period end for a vehicle, as well as a user ID, a reservation of the vehicle is carried out in a computerized reservation system. As far as this is concerned, the advance reservation of vehicles known in both the classical car-sharing systems and the roadside car-sharing systems is used. In the case of roadside car-sharing, the time of the advance reservation is typically limited to several minutes (e.g. a max. of 15 minutes) to allow time to walk to the vehicle.

In addition, a sensor device which monitors the parking spaces verifies the presence of the vehicle. The sensor device monitoring the parking spaces can be a binary presence sensor. A camera can also, and preferably, be used as the sensor device, said camera not only being capable of determining the presence of a vehicle in one of the reserved parking spaces, but also providing further functionality for the vehicle rental system.

Finally, the reservation system displays a vehicle, which has been detected by the sensor device as parked in one of the reserved parking spaces prior to the expiration of the rental period end saved in the reservation system, as available for rental in the reservation system. A depiction of reality can be created in the reservation system by means of the sensor-based detection of the presence of a vehicle in one of the parking spaces reserved for the vehicles. Compared to a reservation system based on calendar entries, greater utilization of the vehicles can be made possible in this way. If the user of the vehicle is only parking the car briefly, in order to unload something or to take the car away again, he or she must make this known.

The method according to the invention is based on the thinking that, given a previously determined period of use of the vehicle, the vehicle must be brought back by its user in a timely manner so that a subsequent user has the vehicle available to him or her in the desired manner. In general, this leads to the fact that the vehicle must be given back prior to the expiration of the rental period end, and therefore is available for use, for example by the subsequent user, at an earlier point in time.

This process is enabled by the presence monitoring of the parking spaces in a location which is only accessible to the circle of users, said parking spaces being reserved for the vehicles provided for temporary rental. In contrast to a data transmission device included in the vehicle, such as are used in vehicles for spontaneous (roadside) car-sharing, by way of example, a real-time depiction of reality can be achieved with little effort and cost. In particular, the monitoring of the availability of vehicles at such locations is also enabled in this way, wherein no radio connection is possible in said locations between a data transmission device located in a vehicle and a corresponding central computer of the reservation system.

The parking spaces are advantageously arranged in one or more properties of the respective owners' community or rental property (e.g. office buildings with corporate tenants), wherein only residents and/or renters of the property in question are subscribers to the vehicle rental system for their property, and optionally for a plurality of other properties. In this case, the term "property" means private residential buildings. A residential building in this case can include the mixed use of apartments, offices and retail units, as well as residential buildings used solely for living purposes. In this context, residential buildings in which the residents and/or renters are already offered various services such as, by way of example, that of property management, a doorman, etc., are particularly suitable properties. The vehicle rental system is integrated into the overall service concept of such properties and can be offered in cooperation with a developer or the owners' community, by way of example. If, in this context, it is residents of the property that are concerned, then private persons who are owners or renters of an apartment used for living purposes are particularly considered the affected party. Renters are specifically the tenants of retail units or offices.

The user group for the vehicle rental system according to the invention in this case is only composed of the residents and/or renters of a property. This user group is automatically registered for the use of the vehicle rental system, and a basic fee can be charged for the use of the vehicle rental system, by way of example, in combination with rental payments. A registration of persons outside of the property is not included in this vehicle rental system. One exception can be guests of the residents with guest IDs. In the process of the automatic registration of the residents and/or renters of the property in question, the driver's license thereof, having an RFID tag, can be used as the use- and access-authorization ID, by way of example. Compared to the known car-sharing systems, the strict limitation of the user group to the residents and/or renters of a property enables substantially more convenient and improved usability. As a result of the fact that private persons and the tenants of offices or retail units are automatically part of the user group, it is possible to achieve a continuous utilization of the vehicles. While the tenants of offices or retail units prefer a use of the vehicles during business hours, private users more frequently use vehicles available on weekends or evenings, according to experience. In this way, an improved exploitation of the vehicles provided in the vehicle reservation system results overall.

In one further preferred embodiment in particular, the user ID of a user is verified for the access to the parking spaces of the property, and access is only granted upon approval of the user ID. In this way, it is ensured that the vehicles available in the vehicle rental system are, in fact, only accessible to the residents and/or renters of a property.

According to a further advantageous embodiment, the user input takes place via a user interface, via which the user is shown vehicles which are available for rental, as a video image, and optionally with further information on the vehicle. User interfaces can be a computer, a mobile device, or a home automation device. All of the named devices have an input and output means such as a display, for example, via which a use of the reservation system is enabled. The transmission of a real-time image rather than a schematic illustration increases the acceptance of the use of a vehicle from the vehicle rental system.

In a further embodiment, available parking spaces are detected by the sensor device and transmitted to a parking space organizer device of the reservation system, wherein information on available parking spaces is transmitted to the locations having the parking spaces, to a user interface integrated into the vehicles, and/or the user interfaces of a user. This approach is based on the thinking that the parking spaces of the vehicle rental system of another property should be made available for users of the vehicle rental system of a first property, for parking. In order to ensure that a parking space is actually available in the desired property, corresponding information regarding the same, and regarding the duration during which a parking space is available, is provided. In particular, in this case, a reservation of an available parking space can be carried out based on a user input, by means of the reservation system.

It is further advantageous if a data set is saved in the reservation system for each user ID, said data set including a property ID of the property in which the user is a renter and/or resident of the property. The ID is assigned to the user ID, as well as rights with respect to the user of parking spaces or other properties. In this case, the term "parking spaces" means such parking spaces as are assigned to the vehicle rental system in this property. Upon the detection of a vehicle of the vehicle rental system at an access point of one of the other properties, the rights for this property assigned to a user are advantageously determined using the property ID of said user, and according thereto, the access control for the entrance and exit of the vehicle to/from the property is opened or not. An access control can be a garage door, a gate, a retractable post, etc., by way of example. In this way, the vehicles of the vehicle rental system of a property are allowed to park in the parking spaces of another property. This authorization can also be based on the user—meaning that the user could also park his or her private vehicle in the other properties.

In order to ensure that sufficient vehicles are available for the vehicle rental system inside one of the properties offering the vehicle rental system, in a further embodiment, when a vehicle is detected at the access control of one of the properties of the vehicle rental system using the vehicle ID thereof, a verification is made of whether this vehicle is a vehicle of a spontaneous (roadside) vehicle rental system, particularly of the same provider, and if it is, the access control is opened for the entrance of the vehicle to the property. Vehicles of a roadside vehicle rental system are therefore granted entrance to the property, and allowed to park in the parking spaces of the vehicle rental system. In contrast, users of the roadside vehicle rental system are not allowed to rent out vehicles available for rent in the property.

Because in the two named variants, the entrance of vehicles participating in a vehicle rental system is enabled in each case, there is consequently no specific verification of the user ID; rather, there is a detection of the vehicles (for example a vehicle ID) themselves.

According to a further advantageous embodiment, according to the rights assigned to a user ID in the reservation system, information on another user of a reserved vehicle is displayed via the user interface in reaction to an input of a user. The rights can be granted, for example, via an optional approval of the person's reservation compared to selected neighbors. This enables multiple users to discuss use times which overlap.

In a further advantageous embodiment, personal settings concerning the vehicle based on a user input or chosen by a user in one of the vehicles of the vehicle rental system are saved in a data storage device of the reservation system together with the user ID, and are loaded into the vehicle and activated by this user upon the later use of this or another vehicle of the vehicle rental system, particularly automatically, when the user uses this or another vehicle of the vehicle rental system. Personal settings concerning the vehicle are, by way of example, saved radio stations, a setting with respect to seat and/or steering wheel position, air conditioning, etc. An adaptation of the personal characteristics to the specific details of a vehicle optionally takes place for different vehicle types. In this context, only models of a single manufacturer are used in the vehicle rental system.

A further advantageous embodiment enables the determination of damage in a returned vehicle, in an automatic manner. For this purpose, the sensor device analyzes the vehicle exterior, for example by means of a scanner and/or a visual scan, and carries out a comparison of the current data with target data saved for this vehicle, and/or with the most recently saved current data. The target data in this case relate to a new vehicle which has no damage. The comparison of the current data to the most recently saved current data enables the detection of a change between the last and next-to-last use of the motor vehicle. In this way, possible damage can be assigned specifically to one particular user. Acceptance is increased in this way, because "manual" searching for damage is time-consuming.

The invention also comprises a vehicle rental system which has a reservation system for carrying out the method as described above.

Other objects, advantages and novel features of the present invention will become apparent from the following detailed description of one or more preferred embodiments when considered in conjunction with the accompanying drawings.

BRIEF DESCRIPTION OF THE DRAWING

The single FIGURE shows a schematic illustration of a vehicle rental system according to the invention.

DETAILED DESCRIPTION OF THE DRAWING

Provided is an arrangement of a vehicle rental system in one or multiple properties of an owners' community, wherein all arrangements contained in the properties are made available exclusively to a user group (circle of users) consisting of residents and/or renters. Properties of this type are, by way of example, living quarters, particularly with services provided therein, such as property managers and doormen (in general: serviced apartments). The user group of the vehicle rental system therefore is composed exclusively of the residents—meaning private persons—of apartments/houses, and/or tenants, particularly offices and retail units. In such property, there are typically parking spaces, commonly in a parking garage, which are only accessible for the residents and/or renters. A portion of these parking spaces is provided for vehicles of the vehicle rental system, wherein only vehicles of the vehicle rental system are allowed to be parked there. The rental vehicles provided in each property can be used by the residents and/or renters for short periods, for example by the hour. The vehicles provided can be, in addition to conventional motor vehicles with combustion engines, electric vehicles, electric bicycles, or bicycles. The selection of which types of vehicles to provide in a property as part of the vehicle rental system is up to the operator of the vehicle rental system, and is based on the user structure and the environment of the property, and the desires of the users, by way of example.

The provision of such a mobility service can particularly be included from the beginning in the planning of properties being newly constructed. In particular, the number of parking spaces required for the vehicle rental system can be determined according to the apartments, office and/or retail units provided in a property. It is likewise possible to separate the parking spaces reserved for the vehicle rental system from the other parking space inside the property, either by a structure, or simply spatially. In addition, in this way it is simple to integrate the technology which is necessary to realize the mobility service.

The participation of the residents and/or renters of a property in the vehicle rental system occurs for the user without a separately required registration. Simply the fact that a person is a resident and/or renter of such a property allows him or her to be a participant in the vehicle rental system. It should be understood that a driver's license must be presented to activate one's membership. This is, by way of example, configured with an RFID chip. No registration fee need necessarily be levied. Base fees which may need to be collected can be billed to the residents and/or renters within the fees for the residential and/or rented space, without a separate bill.

As a result of the technical design of the vehicle rental system and the use options resulting therefrom, on the one hand it is possible to increase the attractiveness of the mobility service compared to car sharing services known to date. As a result of the fact that the mobility service is offered at the location of the living or work space of the user group, these people can dispense with personal vehicles, thereby producing a resource savings with respect to parking space required, resources required for the manufacture and operation of the vehicle, etc. On the other hand, from the point of view of the operator, the mobility service can achieve a high level of utilization. As such, the use of the vehicles during business hours is of interest for the tenants of offices and/or retail units. By way of example, persons can travel to their workplaces by means of public transport. For trips required during the working day, they can take advantage of a vehicle from the vehicle rental system. In this way, good utilization of the vehicles during the week results, in addition to a positive ecological effect. On the weekends, and evenings during the week, according to experience, private persons tend to utilize the vehicle more. The office tenants can optionally also reserve the vehicle in the evening or on the weekend if they are interested. Because billing is based on a monthly base fee and a fee per trip based on a combination of time and distance travelled, it is economically possible for the operator of the vehicle rental system to offer the service within the closed community.

FIG. 1 shows a schematic illustration of two properties 20a, 20b of the type named above, in which a mobility service as described above is offered. For the reason that the first and the second properties 20a, 20b are substantially identical in construction, a detailed description is only provided for the first property 20a. The characteristics and features of the second property 20b can be transferred to corresponding components of the second property 20b in a corresponding manner, said components being indicated by the letter "b" rather than the letter "a."

The first property 20a represents a residential building as described above, which has a parking garage 21a. In the parking garage 21a, there is a plurality of parking spaces for vehicles. By way of example, three of the parking spaces 22a, 23a, 24a are reserved for vehicles of the vehicle rental system according to the invention. In addition, there are further parking spaces for private vehicles (reference numbers 25a, 26a). The parking spaces of the vehicle rental system and the parking spaces for private vehicles can be separated from each other by an access control 27a. It is likewise possible to arrange the parking spaces for the vehicle rental system and the private parking spaces separated from each other spatially in the property, and potentially to provide them with different entrances and exits.

A parking space sensor device 32a, 33a, and 34a of a sensor system, which is indicated as 30a as a whole, is functionally assigned to each parking space 22a, 23a, 24a of the vehicle rental system. The parking space sensor device 32a, 33a, 34a primarily serves the purpose of determining the presence of a vehicle in each of the monitored parking spaces. As such, the parking space sensor device can be designed as a binary presence sensor. The parking space sensor device preferably has—alternatively or additionally—at least one camera which is capable of capturing a real-time image of the vehicle parked in the monitored parking space. This can then be presented to the user during the reservation process of the vehicle, on a user interface. Moreover, each of the parking space sensor devices 32a, 33a, 34a can be designed for the purpose of detecting potential damage to a vehicle by carrying out a comparison of current data on the exterior condition with, optionally, target data of a new vehicle, or with the most recently saved target data. For this purpose, the parking space sensor device can have corresponding scanners or image processing systems.

The sensor device 30a further has an access control sensor device 39a which is functionally assigned to an access control 29a at an entrance 28a. Where the following description refers to an entrance, the term should also be taken to mean an exit. It is not essential for understanding the principle of the invention whether the entrance and exit to/from the property take place via one and the same gate.

The access control 29a serves the purpose of protecting the entrance 28a from unauthorized access by a third party. The access control 29a can be constructed as a garage door, or optionally as a gate barrier or retractable posts.

Although the present description addresses the provision of the parking spaces of the vehicle rental system in a parking garage of a property, the parking spaces could be entirely or partially provided in an outdoor space as well. What is essential for the present invention is that the location of the parking space is only accessible to the user group named above, consisting of residents and/or renters of the property. It should be understood that in the context of the vehicle rental system according to the invention, multiple entrances and exits could be available for the parking space of the vehicle rental system, wherein in this case the corresponding access control would be configured at each entrance together with the access control sensor device.

Parking space sensor devices 32a, 33a, 34a and access control sensor devices 39a are coupled to each other and to a reservation system 10 via a communication link. The communication link can be designed according to the principle of a bus system, as illustrated in FIG. 1. In principle, any other type of communication link could be contemplated. In particular, individual sensors, or all of the sensor devices, could also communicate with the reservation system 10 wirelessly.

While the first property 20a only comprises three parking spaces 22a, 23a, 24a for the vehicle rental system, the second property 20b has a total of four parking spaces 22b, 23b, 24b, 25b for vehicles of the vehicle rental system. For reasons relating to the aspects of the drawing, only one private parking space 26b is illustrated in the second property 20b, which is likewise separated from the parking spaces of the vehicle reservation system by an access control 27b. The corresponding parking space sensor devices are likewise connected to the communication link 11 and therefore to the reservation system 10.

User interfaces for the user group of the vehicle rental system are indicated with the reference numbers 15, 16, and 17. The user interface 15 is, by way of example, a PC which is connected to the communication link 11 via wire, by way of example. The user interface 16 represents, by way of example, a home automation device, such as a video intercom system which has been expanded in its functionality, for example. A mobile device, such as a smart phone or laptop, by way of example, is indicated with the reference number 17, and can communicate wirelessly with the reservation system 10. The user interfaces 15, 16, 17 have corresponding software which is, by way of example, browser based, and offer use of the reservation system for renting a vehicle of the vehicle rental system.

Only by way of example, a vehicle 50a is parked in the parking space 23a of the first property 20a. In the second property 20b, vehicles parked in the parking spaces 23b, 24b are indicated by the reference numbers 50b and 51b.

The reservation system 10 has a parking space organizer device 13, in addition to a central computer 12 for the purpose of detecting and processing user inputs (reservations) made via the user interfaces.

The use of the vehicle rental system is described below using the example of the use/rental of a vehicle 50a of the first property 20a, by a resident and/or renter.

The reservation of a vehicle takes place by using the user interfaces 15, 16, 17 and a user input which contains at least one piece of data on a rental start period and a rental end period of a vehicle, as well as a user ID. In addition, a vehicle ID and a property ID are saved in a corresponding database. The vehicle ID identifies the reserved vehicle. The property ID represents information on the property and the vehicle or vehicles assigned to the same. The same vehicle 50a is potentially reserved by a further resident and/or renter of the first property 20a directly upon the rental period end of the first rental process.

In order to ensure that the subsequent renter can have the vehicle at the time he or she desires, the first renter of the vehicle 50a must have parked this vehicle in one of the parking spaces 22a, 23a, 24a in the first property 20a prior to the rental period end. At this point, the parking space sensor device 33a, which monitors the parking space 23a, verifies the presence of the vehicle 50a prior to the rental period end of the first renter. This status is then made known in the reservation system. On the one hand, the subsequent, second renter of the vehicle can be informed of a potentially earlier rental period start. If such a reservation has not yet been made, then on the other hand the vehicle 50a is displayed in the reservation system as available for rental. The parking space sensor device therefore enables a depiction of the reality of the presence of a certain vehicle in the reservation system. This enables an overall better utilization of the vehicles available in the first property 20a.

As far as data transmission devices provided inside the vehicles of the vehicle rental system are concerned, it is also possible to ensure the early return or presence of a vehicle in one of the parking spaces even if the data transmission device itself does not have a communication link with the reservation system 10. This situation occurs frequently in parking garages in which the corresponding radio signals are shielded by thick concrete structures.

The access control sensor devices implemented at the entrances 28a, 28b of the properties 20a, 20b make it possible for the vehicles assigned to the property 20a to be ensured a space to park in a free parking space of the property 20b. In this case, the access control sensor device 39a detects the presence of the vehicle 50a, and can check the rights assigned to the same with respect to the user of parking spaces of other properties by using the user ID, the vehicle ID and/or the property ID. By way of example, the mobility service may include the granting of parking rights in the parking spaces 22b, 23b, 24b, 25b of the second property 20b to the vehicles 50a of the first property. Following a corresponding verification by the access control sensor device 39b, the access control 29b is opened such that the vehicle 50a can park in one of the free parking spaces 22b-25b.

The parking space organizer device 13 determines whether parking spaces are available in the second property 20b for the vehicle 50a of the first property 20a. The parking space organizer device 13 has information on the free parking space due to the parking space sensor devices monitoring the parking spaces. The corresponding information is transmitted if desired to a user interface, and/or one of the user interfaces 15, 16, 17, integrated into the vehicles, which is available to the user of a vehicle.

In order to make it possible to provide the residents and/or renters of the property 20a, 20b with sufficient availability of vehicles for a rental, vehicles of a spontaneous (roadside) vehicle rental system can use available parking spaces of the vehicle rental system in the properties 20a, 20b for parking. In this case, however, only the entrance of such vehicles to the corresponding properties is granted. The parking spaces are displayed as available to participants in the roadside car sharing system if the same happen to be driving. If, in contrast, they make a reservation request for a vehicle, the vehicles in the parking spaces of the residential building are not displayed to the roadside service subscribers. The vehicles of a roadside vehicle rental system are not allowed to exit if they are not being used by a renter and/or resident of the associated property. A corresponding verification can take place by means of the vehicle IDs and user IDs.

By way of example, when a vehicle parked in one of the parking spaces of the vehicle rental system is opened, the vehicle in question determines whether it has been opened by a resident and/or renter of the property in question. If this is the case, the access control is opened for the exit thereof by the access control sensor device to which it is assigned. Other services can be contemplated, e.g. that vehicles which are reserved from the residence are automatically driven out of the parking garage upon the request of the resident (such that the resident can get into the vehicle directly in front of the house), if the functionality of autonomous driving is available in the vehicles.

The rights of the residents and/or renters of a particular property with respect to the use of the parking spaces of another property can be managed for any spatial region. By way of example, it can be possible for the residents and/or renters of select properties to park vehicles in all properties of a city or a country which belong to the vehicle rental system. On the other hand, this right can be denied to residents and/or renters of other properties, such that the same can only use the properties in their city, by way of example. One possibility could be, for example, that only residents who have made parking spaces in their own site available for users of other sites are allowed to likewise park in other sites.

As a result of the fact that the user group of the vehicle rental system is limited to the residents and/or renters of a property, it is possible to make certain information about other users which is required for the reservation of a vehicle available to a user making a reservation. In this way, there can be a direct consultation between users in the event that overlap may occur in the reservation of a vehicle.

One advantage of the vehicle rental system according to the invention is that users from a property are provided with mobility directly at the location of the property. As a result of the closed community of a property, it can be easier to agree on requests for changes. Available parking spaces are more fully utilized because multiple residents and/or renters share a car. The number of private vehicles is reduced (a car share vehicle replaces 4-8 private vehicles according to studies). The users have more parking space overall, which is also made available in other cities. The vehicle rental system is particularly suitable for properties in such cities or neighborhoods in which there is a significant parking problem, and where residences are used, for example, as second or third apartments.

The vehicle rental system provides an expansion of spontaneous car-sharing—so-called roadside car sharing. In this way, parking space in the city center is secured.

The housing of vehicles in parking garages or parking spaces of the associated properties is convenient for the users and helps to protect the vehicles. To use a vehicle of the vehicle rental system, the users need not travel long distances—in contrast to previous solutions. The use can take place as though it were a private vehicle.

Parking spaces of the vehicle rental system which are not used by vehicles assigned to a property can be used by vehicles of another vehicle rental system, for a fee. A corresponding billing process can be realized by means of the parking space sensor device monitoring the parking spaces. Likewise, a parking fee can be levied for vehicles of the vehicle rental system from other cities.

The parking space concept can likewise incorporate parking garages of partner businesses—for example companies with offices in central locations. In order to maximize the efficiency and acceptance of the vehicle rental system, it is advantageous if the properties providing the vehicle rental system are distributed as regularly as possible in a city. In particular, centers of congestion are suitable for the realization of the vehicle rental system.

LIST OF REFERENCE NUMBERS 10 reservation system
11 communication link 12 central computer
13 parking space organizer device
15 user interface (for example, PC)
16 user interface (for example, home automation device)
17 user interface (for example, mobile device)
20*a* first property
21*a* parking garage
22*a* vehicle rental system parking space
23*a* vehicle rental system parking space
24*a* vehicle rental system parking space
25*a* other parking space
26*a* other parking space
27*a* access control between parking spaces of the vehicle rental system and other parking spaces
28*a* entrance
29*a* access control
30*a* sensor device
32*a* parking space sensor device
33*a* parking space sensor device
34*a* parking space sensor device
39*a* access control sensor device
50*a* vehicle which is assigned to the first property
20*b* second property
21*b* parking garage
22*b* vehicle rental system parking space
23*b* vehicle rental system parking space
24*b* vehicle rental system parking space
25*b* vehicle rental system parking space
26*b* other parking space
27*b* access control between parking spaces of the vehicle rental system and other parking spaces
28*b* entrance
29*b* access control
30*b* sensor device
32*b* parking space sensor device
33*b* parking space sensor device
34*b* parking space sensor device
35*b* parking space sensor device
39*b* access control sensor device
50*b* vehicle which is assigned to the second property
51*b* vehicle which is assigned to the second property The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle rental system in which a number of vehicles is provided to a defined user group for a temporary use period, the defined user group being residents and/or renters of one or more locations at which the vehicles are made available exclusively to the defined user group, said one or more locations having one or more parking spaces reserved for the provided vehicles, wherein the vehicle rental system comprises:
    a parking space sensor operatively configured to monitor the one or more parking spaces reserved for the provided vehicles in order to detect a presence or absence of a vehicle;
    an access control sensor operatively configured to detect vehicles at an access control to each of the respective one or more locations and to verify user IDs corresponding to detected vehicles for access to the one or more parking spaces of the respective one or more locations;
    a computer-implemented reservation system coupled with the parking space sensor and the access control sensor, the computer-implemented reservation system comprising a processor and memory for storing executable program code segments that:
        create rental reservations for available vehicles based on user input, the user input for each respective rental reservation comprising at least one of: a rental start period and a rental end period of the vehicle, along with a user ID, wherein the rental reservations include:
            a first rental reservation created for a first user, wherein the first rental reservation includes a first rental start period and a first rental end period for the vehicle, and
            a second rental reservation created for a second user, wherein the second rental reservation includes a second rental start period and a second rental end period for the vehicle, wherein the second rental start period is subsequent to an expiration of the first rental end period, and wherein the second rental reservation is created prior to an early return of the vehicle;
        determine, based on the detection of the vehicle by the parking space sensor, the early return of the vehicle by the first user, in which the vehicle is present in the one or more parking spaces prior to the expiration of the rental end period of a first rental reservation;
        inform the second user, via a user interface and based on the determined early return and the second reservation, that the vehicle is available for an early use pursuant to the second rental reservation, wherein the early use starts earlier than the second rental start period and prior to the expiration of the first rental end period; and
        open the access control to a respective one of the one or more locations in response to detecting, by the access control sensor, a vehicle at the access control to the respective one of the one or more locations and verifying access rights assigned to a user ID that corresponds to the detected vehicle; and
    a user interface device by which the user provides the user input, wherein a display of the user interface device displays the identified vehicle as being available for the second rental reservation prior the expiration of the first rental end period,
    wherein personal settings concerning the vehicle based on a user input or chosen by a user in one of the vehicles of the vehicle rental system are saved in a data storage device of the reservation system together with the user ID, and are loaded into the vehicle and activated, when the user uses the vehicle or another vehicle of the vehicle rental system.

2. The vehicle rental system according to claim 1, wherein the user input is given via a user interface, via which a user is presented with vehicles available for rental by a video display.

3. The vehicle rental system according to claim 2, wherein the user is also presented with further information on the vehicle.

4. The vehicle rental system according to claim 1, wherein free parking spaces are detected by the parking space sensor and reported to a parking space organizer device of the reservation system, wherein data is transmitted to a user interface integrated into the vehicle, and/or to user interfaces, at the location with the parking spaces, concerning parking spaces which are available.

5. The vehicle rental system according to claim 4, wherein a reservation of an available parking space is carried out by the reservation system based on a user input.

6. The vehicle rental system according to claim 1, wherein, according to rights assigned to the user ID in the reservation system, information on another user of a reserved vehicle is displayed via the user interface in reaction to an input of a user.

7. The vehicle rental system according to claim 1, wherein, if there are different types of vehicles, an adaptation of the personal characteristics to the specific details of the vehicle is carried out.

8. The vehicle rental system according to claim 1, wherein the one or more parking spaces are arranged in one or more properties of a community of owners, and only defined individuals of the property are allowed to participate in the vehicle rental system for their property.

9. The vehicle rental system according to claim 8, wherein the defined individuals are participants also for a plurality of other properties.

10. The vehicle rental system according to claim 1, wherein a data set is saved in the reservation system for each user ID, said data set comprising a property ID of the property in which a user is in the user group of the property, the property ID being assigned to the user ID, along with rights with respect to the user for parking spaces in other properties.

11. The vehicle rental system according to claim 10, wherein, upon the detection of a vehicle of the vehicle rental system at an access control of another property, the rights of a user for said other property are determined using the property ID of the user, and access control is opened or not, for entrance and/or exit of the vehicle into/from the other property according to said rights.

12. The vehicle rental system according to claim 1, wherein the parking space sensor is configured to analyze a vehicle exterior for detecting damage to a returned vehicle, wherein current data for the vehicle exterior is compared by the reservation system with target data for the returned vehicle.

* * * * *